US006353794B1

(12) United States Patent
Davis et al.

(10) Patent No.: US 6,353,794 B1
(45) Date of Patent: Mar. 5, 2002

(54) AIR TRAVEL INFORMATION AND COMPUTER DATA COMPILATION, RETRIEVAL AND DISPLAY METHOD AND SYSTEM

(75) Inventors: Barry Davis, Shoreline; Scott Blachowicz, Bothell; Larry Brasfield, Mercer Island; Dennis Howard, Seattle, all of WA (US); David Helms, Houston, TX (US); Craig Paynter, Renton; Randy Robertson, Kirkland, both of WA (US); James Rouse, Houston, TX (US)

(73) Assignee: AR Group, Inc., Houston, TX (US)

( * ) Notice: Subject to any disclaimer, the term of this patent is extended or adjusted under 35 U.S.C. 154(b) by 0 days.

(21) Appl. No.: 09/421,167

(22) Filed: Oct. 19, 1999

(Under 37 CFR 1.47)

(51) Int. Cl.[7] .......................... G01C 21/00; G08G 1/123
(52) U.S. Cl. ....................... 701/201; 701/202; 701/200; 701/206; 701/207; 701/208; 701/211; 340/990; 340/995; 455/456; 342/36
(58) Field of Search ................................ 701/200, 201, 701/202, 206, 207, 208, 211; 340/990, 995, 991, 993; 455/456; 342/36; 345/23, 33

(56) References Cited

U.S. PATENT DOCUMENTS 5,802,492 A * 9/1998 DeLorme et al. ........... 701/200

* cited by examiner

Primary Examiner—William A. Cuchlinski, Jr.
Assistant Examiner—Arthur D. Donnelly
(74) Attorney, Agent, or Firm—Haynes & Boone, LLP

(57) ABSTRACT

A system, method, and computer program for managing integrated real-time information about air flight trips and providing that information to multiple users by way of a flight operations system (FOS), including a data engine (DE) and render engine (RE). A computerized Upstream Distribution Center (UDC) containing a packet manager connects to the FOS and to a user interface including a computer display using text, image and color. The UDC is connectable to multiple user interfaces containing copies of the computer program through computer networks by which information is collected and propagated on a real time basis using object-relational mapping, object caching and proactive notification or "push" technology.

33 Claims, 12 Drawing Sheets

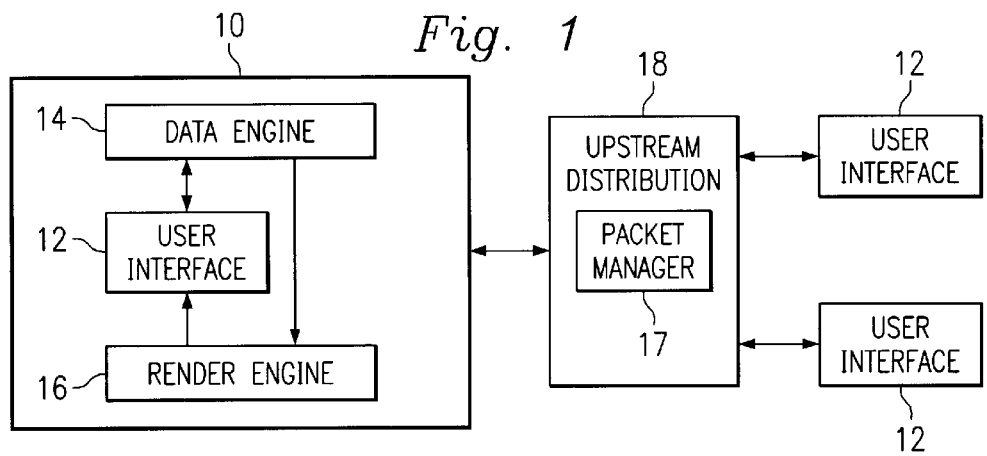
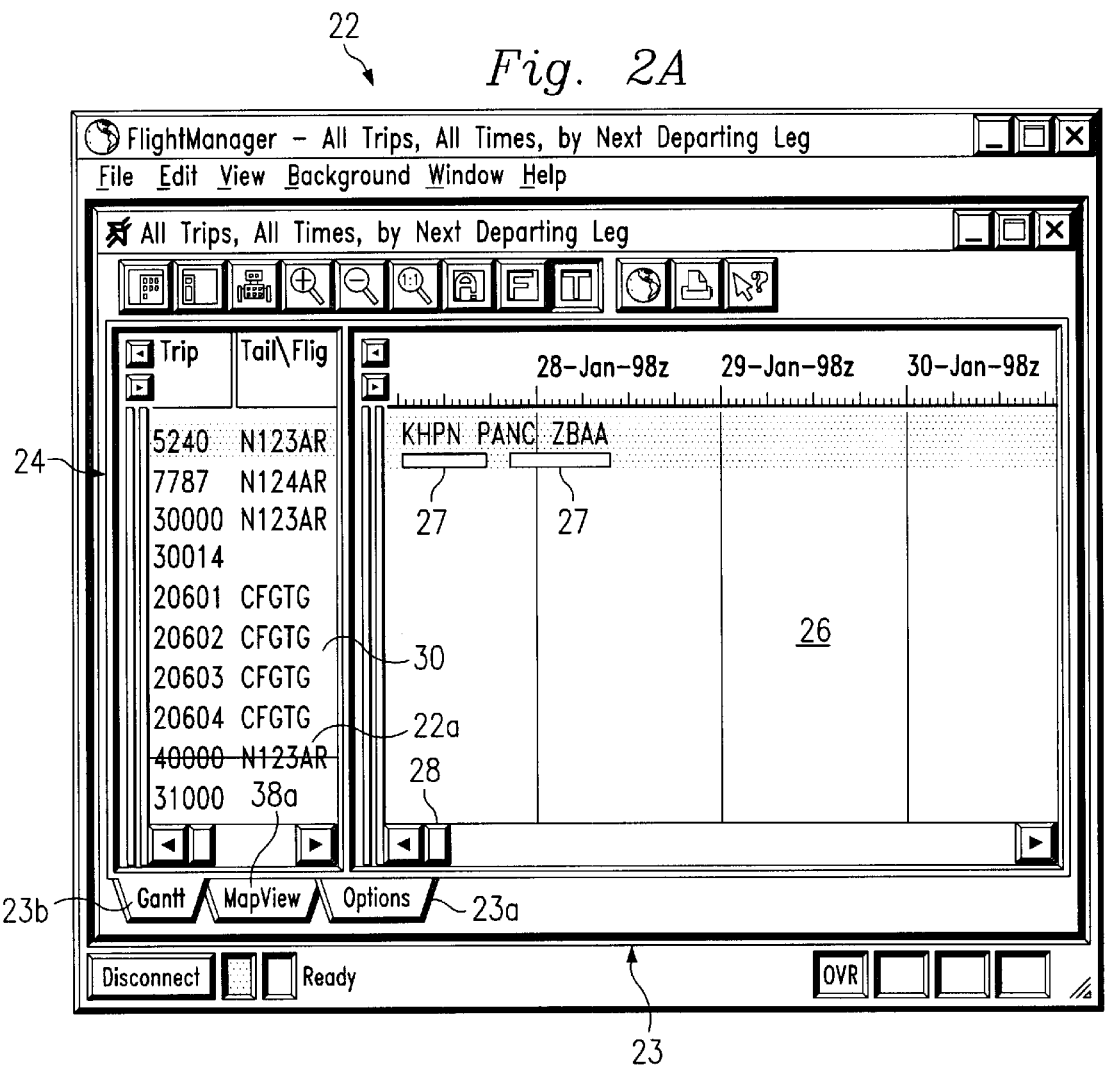

AIR TRAVEL INFORMATION AND COMPUTER DATA COMPILATION, RETRIEVAL AND DISPLAY METHOD AND SYSTEM

BACKGROUND OF THE INVENTION

The present invention relates generally to air travel information dissemination, and more particularly, to a system and method for selecting, compiling, retrieving, and displaying air travel information and related computer data.

In the aviation service industry, planning and executing a flight can involve multiple vendors, each having information and facilities for successful completion of the journey. For a dispatcher, the entire process is a complex one, particularly when providing full corporate jet service. Receiving a client's request for a flight, scheduling and controlling the flight, and arranging a wide variety of ground services from multiple vendors such as fueling, ground transportation, and security, are involved in providing full service to the client. Real time variables often require changes in scheduled service, and those changes need to be quickly communicated to the client and vendors. For example, when an aircraft encounters unexpected adverse weather, the aircraft may need to land at a different airport creating a need for different ground transportation or security arrangements. Conversely, an event on the ground may require changes to the flight plan of the aircraft.

Various software packages are commercially available in the market relating to flight information systems, but available systems are limited to certain phases and are relatively static. For example, some scheduling software allows an itinerary of a client to be entered before the flight takes off, and other information to be entered into a database after the flight is completed. These packages provide for information storage and retrieval, but do not provide dynamic real time operational information.

What is needed is a dynamic, integrated flight information system that makes available to dispatchers real-time information pertaining to a flight so that they can make adjustments and communicate them to vendors and clients on a real-time, as needed basis.

SUMMARY OF THE INVENTION

A system and method for providing and managing integrated real-time flight information for dispatchers, vendors and clients is provided. With the help of a computer, a dispatcher or other user of a flight operations system (FOS) can have direct access to trip details as they happen in real-time. Information about airport, computerized flight plans, aircraft location customized weather maps, historical data, billing information and the like, are all available at the fingertip of the user of the system. A dispatcher or other user can access needed information pertaining to one or more scheduled or in progress or completed flights for which they are responsible, at any time, in any place, by using a dial-up connection service or an Internet connection. Historical information is similarly made available for reference in making changes in a preplanned trip, as needed. Once an access connection is made, the user can observe various trip details being updated periodically, or on request, online. In addition, critical information is available through the access connection about the status of all flight related factors such as customs, permits, catering, ground transportation, slots, and flight plans, at close to animation speeds.

The FOS includes a Data Engine (DE) and a Render Engine (RE). A computerized Upstream Distribution Center (UDC) containing a Packet Manager (PM) is connected to the FOS. Both the RE and DE are further connected to one or more user interfaces generated by application software on a computer display. The UDC can make connections to multiple user interfaces through computer networks to propagate information. The UDC distributes information by way of packet based networks. Object-relational mapping, object caching and proactive notification or "push" technology is used for constantly updating the information disseminated from the UDC to the user interfaces. In order to present real time updates to multiple remote user interface displays, the FOS brings software codes in SQL code format directly into an object based database engine in the memory of a front end computer, such as one used by a client in a remote location, and builds the DE as well as other software scripts that are necessary to interact with other components of the FOS. This architecture of storing object modules in memory of a front end user/client computer instead of on a computer server disk speeds up the retrieval of the information, and makes it possible for the RE to produce instant animated graphical representations of the information.

Further, the FOS produces a series of user friendly interactive screens to extract specific user selected information for planned, in progress and completed trips involving air travel, bringing together for user access trip identification information and tasks and environmental factors related to accomplishing the trip.

BRIEF DESCRIPTION OF THE DRAWINGS

FIG. 1 illustrates an over view of a flight operations system (FOS) according to one embodiment of the present invention.

FIG. 2A shows a Trip List screen of the FOS of FIG. 1.

DESCRIPTION OF THE PREFERRED EMBODIMENT

Figure 2B:
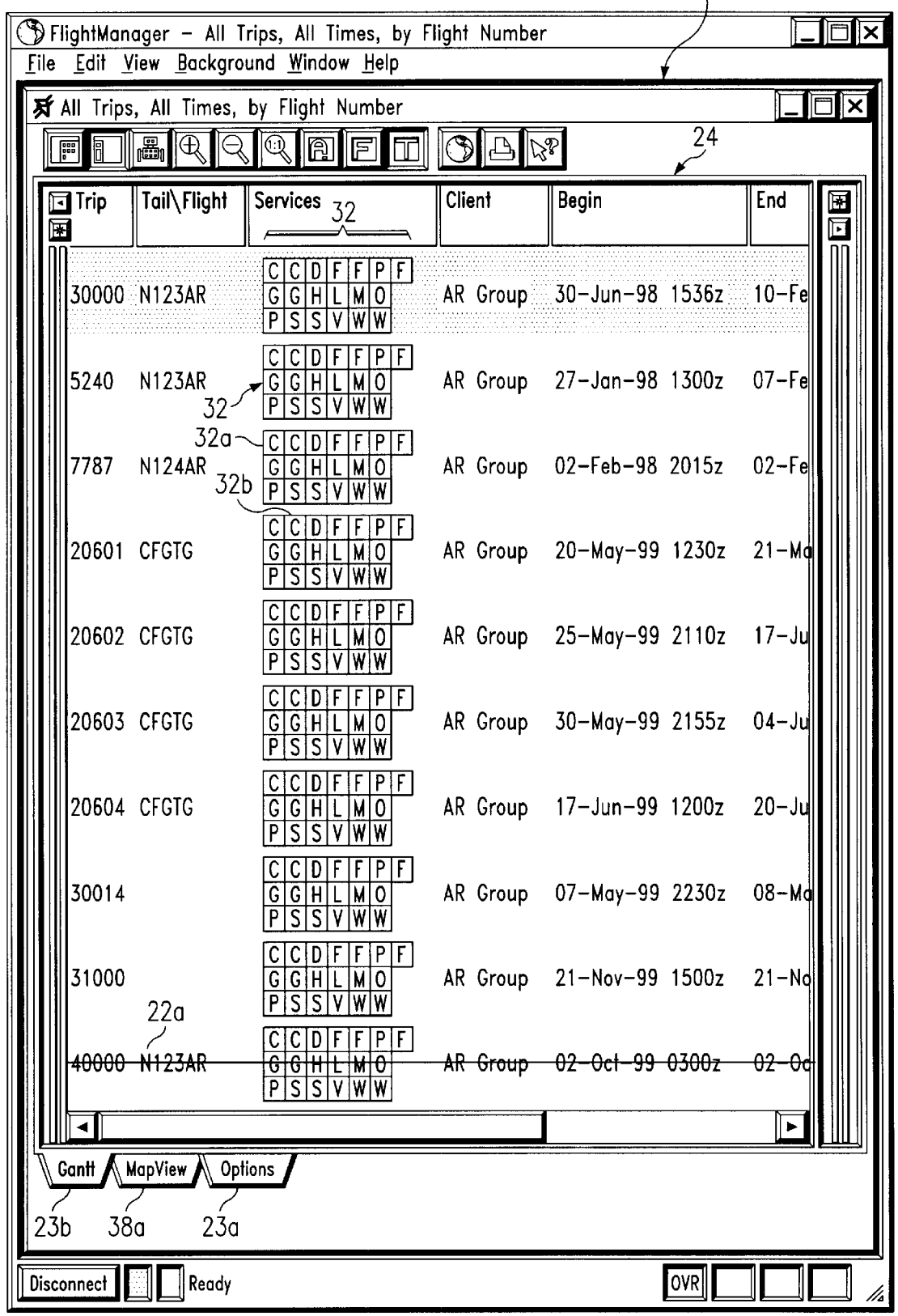
FIG. 2B shows a close view of the left Gantt Pane of FIG. 2A.

Referring now to FIG. 1, an overview of a flight operations system (FOS) is shown. The FOS 10 is implemented through networked computers. The FOS 10 includes a user interface (UI) 12, a software Data Engine (DE) 14 for processing various data stored in a computer database, and a software Render Engine (RE) 16 that is responsible for graphic or animation data processing. The DE is also connected to a Packet Manager (PM) 17 connected to an Upstream Distribution Center (UDC) 18.

In one embodiment of the present invention, the FOS 10 is installed at Operational Center (OC). A flight department operator at the OC can enter, review, or alter information from the UI 12 of the user program at the OC. An end user can access the FOS information from the UI 12 of another copy of the user program.

Once a computer network connection is made to the UDC from any UI 12, an object-relational mapping, object caching and proactive notification or "push" technology is used by the FOS 10 for constantly updating the information disseminated from the UDC 18. The PM 17 is generally responsible for providing and processing data streaming into the FOS 10. The RE 16 is dedicated to processing graphic images such as a flight map in which a geographic location of an aircraft is shown. The DE 14 stores an object relational representation of back-end SQL data in memory. This architecture of storing the object modules in memory, instead of on a computer server disk, speeds up the retrieval of the information, and makes it possible for the RE 16 to produce instant and animated graphical representations.

In order to integrate air travel and related information for planning and executing trips involving at least one flight, the FOS collects the air travel and related information, updates the air travel and related information by using push technology, and makes available real time updates of air travel and related information through computer networks. The air travel and related information includes trip identification information, tasks to be and being performed during trip, and environmental factors affecting the trip. The basic trip identification information preferably includes a uniquely assigned number representing the trip, a tail number for a designated aircraft, and a pilot name for the designated aircraft. Basic environmental factors include real time weather information, such as wind speed and air temperature, and satellite radar images. Task information covers various services scheduled, in progress and completed. All of this information is accessible through various graphical user interface (GUI) screens of the FOS, from the UI 12's, either at the OC, or from a remote location connected to the UDC 18.

The UI 12 enables a user at the OC to view information as well as enabling a remote user to view information. Several categories of GUI screens are available, as illustrated in FIGS. 2 through 5, including a Trip List category illustrated in the GUI screen of FIGS. 2A through 2D, a Map View category illustrated in FIGS. 3 and 5, and a Trip View category illustrated in FIGS. 4A through 4E. Several ways of viewing trip identification and services information as well as environmental factor information are available within each view category. The particular pieces of information displayed can be user selected for each viewing option, as discussed in more detail below in the context of particular GUI screens illustrated by way of the remaining figures.

As more fully explained in the following explanation of the figures, the Trip List category enables viewing information about several trips at one time, and the Trip View category provides the most detailed information about a single trip, e.g., its different legs, tasks related to each leg, and the status of the tasks. The term "leg" refers to a trip segment between any two airports. Therefore, if an aircraft flies from Austin through Houston to Dallas, the entire trip has two legs, which is the one from Austin to Houston, and the other from Houston to Dallas.

FIG. 2A illustrates a Trip List category screen 22 for displaying trip information for a particular client. Planned but canceled trips are listed with a strike through line, such as the trip numbered 22a in FIG. 2A. The Trip List Screen 22 includes all trips scheduled for the client at the OC, for all trip times, sorted by the next departing leg of the trips, as noted in menu bar 23. That particular selection and sorting is done by user selection in an Options GUI screen (not shown) for data filtering which can be invoked using Options tab 23a.

The particular screen 22 shown in FIG. 2A has been invoked by a user by, for example, selection of Gantt view tab 23b. Trips details are displayed in list form in left Gantt Pane 24. Trip legs are displayed against a date and time scale in right Gantt Pane 26 by way of trip bars such as trip bar 27. The user can view the information in the panes 24 and 26 without horizontal truncation by using scroll bar 28 or moving the separation bar 30. Each trip is represented by a number assigned at the OC. As shown on the left Gantt Pane 24, for example, the highlighted number "5240" under the column heading "Trip" represents a unique trip number assigned at the OC for a particular trip planned for a particular client. By default, the trip list is sorted based on Trip number, but it can also be sorted or viewed based on aircraft tail numbers (displayed under the column headed "Tail/Flight") using the Options screen by way of the Options tab 23a. If the full list length of available information does not fit on the screen, a mouse operated scroll bar or keyboard down arrow can be used to scroll through the full list of information in the left and the right Gantt Panes.

FIG. 2B illustrates some of the additional information available in the left Gantt Pane 24 when the right Gantt Pane 26 is hidden in the background. The left Gantt Pane 24 of FIG. 2B displays details about the trip in columns labeled Trip, Tail\Flight, Services, Client, Begin and End. Two additional columns headed itinerary and Pilot (not shown) are available by scrolling or enlarging the screen frames. The Tail\Flight column displays the registered tail number of the aircraft assigned to each listed trip. The "Services" column displays a list of services available for the selected trip, and uses color to represent a status of each displayed service. The client name is displayed under "Client." "Begin" is the starting date and time of the trip. The "End" column displays the ending date and time of the trip. The "Itinerary" column lists the ICAO codes of all the airports for all legs of each trip. The pilot's name is displayed under "Pilot." When a trip is selected in the left Gantt Pane 24, its corresponding legs are highlighted in the right Gantt Pane 26, as shown in FIG. 2A.

Different services for trips and their status are color-coded in the left Gantt Pane 24 as shown in FIG. 2B. Available services are represented as boxes 32, each box containing a letter representing the services. Each box stands for a service and each color represents the current status of that service, e.g., Critical (red), In Progress (orange), Waiting for Client Decision (blue), Done (green), Canceled (grey) or Not Requested (dark gray). For example, box 32a containing the letter "C" represents catering service, and box 32b containing the letter "F" represents fuel services. Use of a pointing device or keyboard to highlight a box invokes a pop up display (not shown) of more detailed information about the service represented by the box. The available services represented by the boxes 32 shown in FIG. 2B include:

1. Catering
2. Customs setup
3. Delivery
4. Flight following
5. Flight plan
6. Flight plan preliminary
7. Fuel 8. Ground handling
9. Ground transportation
10. Hotel
11. Landing permits
12. Overflight permits
13. Profile
14. Security guard
15. Slots
16. Weather brief
17. Miscellaneous
18. Visa
19. Weather outlook The boxes 32 containing the letters for each service or task are color-coded to indicate the current status of each task. This arrangement gives the user an immediate visual overview of multiple services available from the OC for a trip, and the current status of those tasks being provided on a particular trip.

Each of the task boxes 32 assumes the color of the most critical status of a particular task within any leg of a given trip. For example, if catering has been requested for all legs of the trip, and if the status for Catering is 'In Progress' for one leg, but 'Done' for the rest of the legs, the color of the catering task box 32a will be orange, the In Progress color. This feature makes it clear through its use of colors when a service requested has not yet been completed for at least one leg of a trip.

Turning back to FIG. 2A, each leg of a trip is displayed in the right Gantt Pane 26 against a date and time scale, as bars 27. Each of the bars 27 extend from departure to arrival date and time. In order to view more legs on the Gantt Pane 26, the time scale can be adjusted. The departure and arrival ICAO airport codes for each leg are conveniently displayed above each of the displayed leg bars 27.

As with the services, color is used for the leg bars 27 to indicate the most critical status of any requested service for that leg. The color of the leg is determined by the status of the most critical task for that leg. For example, if all the requested tasks for the leg are "Done," except for one which has the status "In Progress," then the leg will be displayed in orange, which is the color representing the status of "In Progress." On the other hand, if the status of all the tasks of the leg is "Not Requested" except one particular task, which has the status "Waiting Client Decision," the leg will be displayed in blue. If all the tasks are "Done" except for the Flight Following task, then the color of the leg is dark green.

Figure 2C:
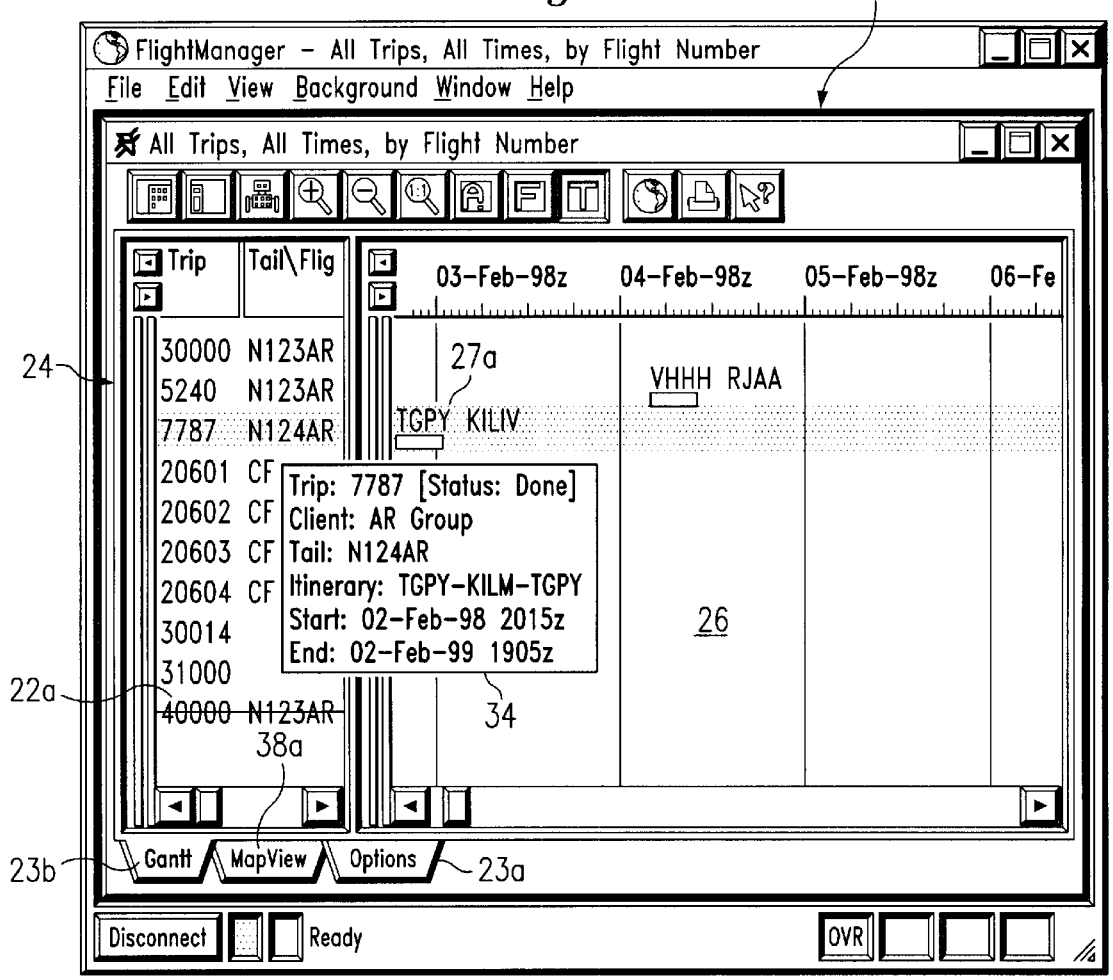
FIG. 2C shows the Trip List screen of FIG. 2A with a pop-up text box invoked from the left Gantt screen.
Figure 2D:
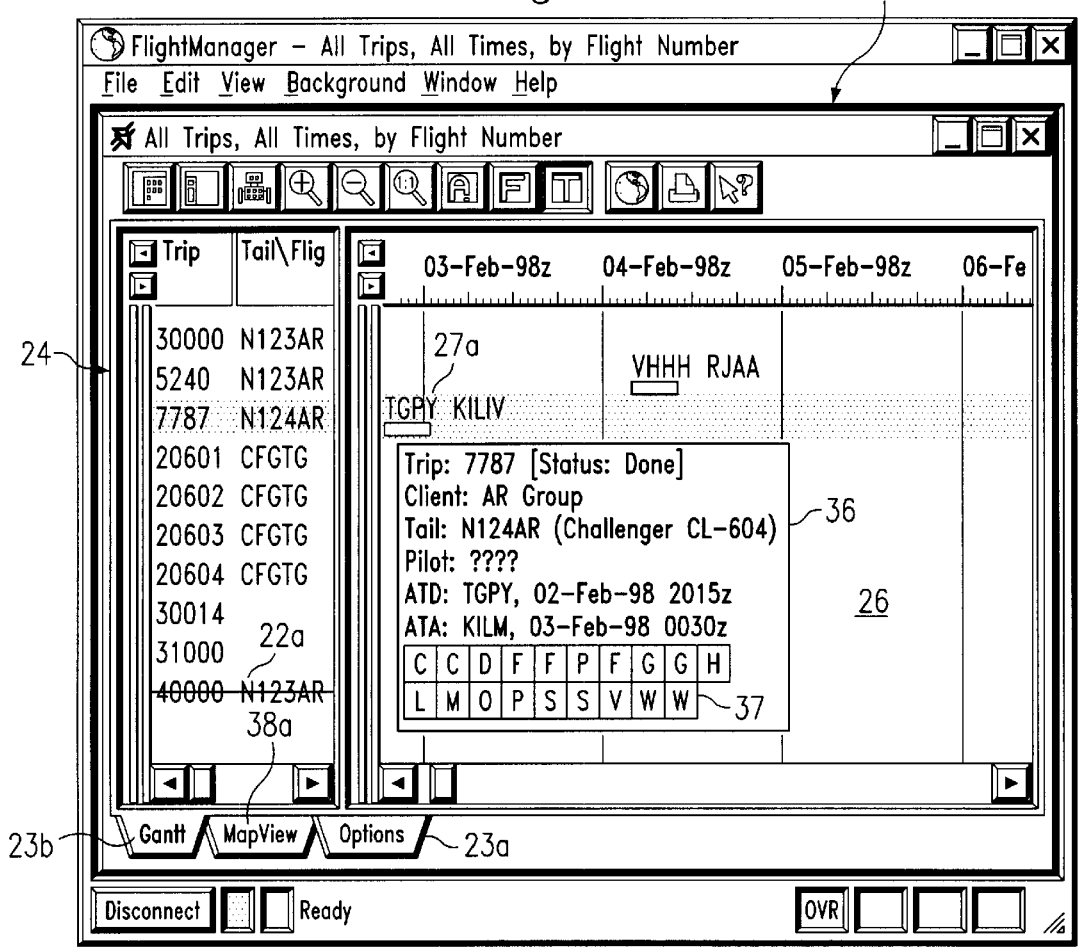
FIG. 2D shows the Trip List screen of FIG. 2A with a pop-up text box invoked from the right Gantt screen.

Referring to FIGS. 2C and 2D, pop-up text boxes can be invoked from the left or right Gantt Panes 24 and 26 to display additional information about a trip or a particular leg of a trip. A user can select a particular trip and click on a column within that trip to view more details about the information covered by the column heading. For example, as shown in FIG. 2C, pop-up text box 34 can be invoked from the left Gantt Pane 24 to reveal the status of a trip, e.g., trip number 7787, as well as additional information available from the left Gantt Pane 24, for the selected trip as a whole. As shown, the pop-up text box 34 contains the Trip number and Tail\Flight number, Client, Itinerary, and Start and End time of the entire trip. As shown in FIG. 2D, with trip number 7787 highlighted, clicking on its leg bar 27a in the right Gantt Pane 26 invokes pop-up text box 36 which textually displays the status of that leg as "done," and also displays detailed information including Trip number, Tail\Flight number, and Client, Pilot name, Airport to Depart (ATD) and Airport to Arrive (ATA) information. In addition, at the bottom of the text box 36 shown at 37, the different services available and their status are displayed, in a line of colored task boxes similar to the Colored task boxes 32 of FIG. 2A.

Figure 3:
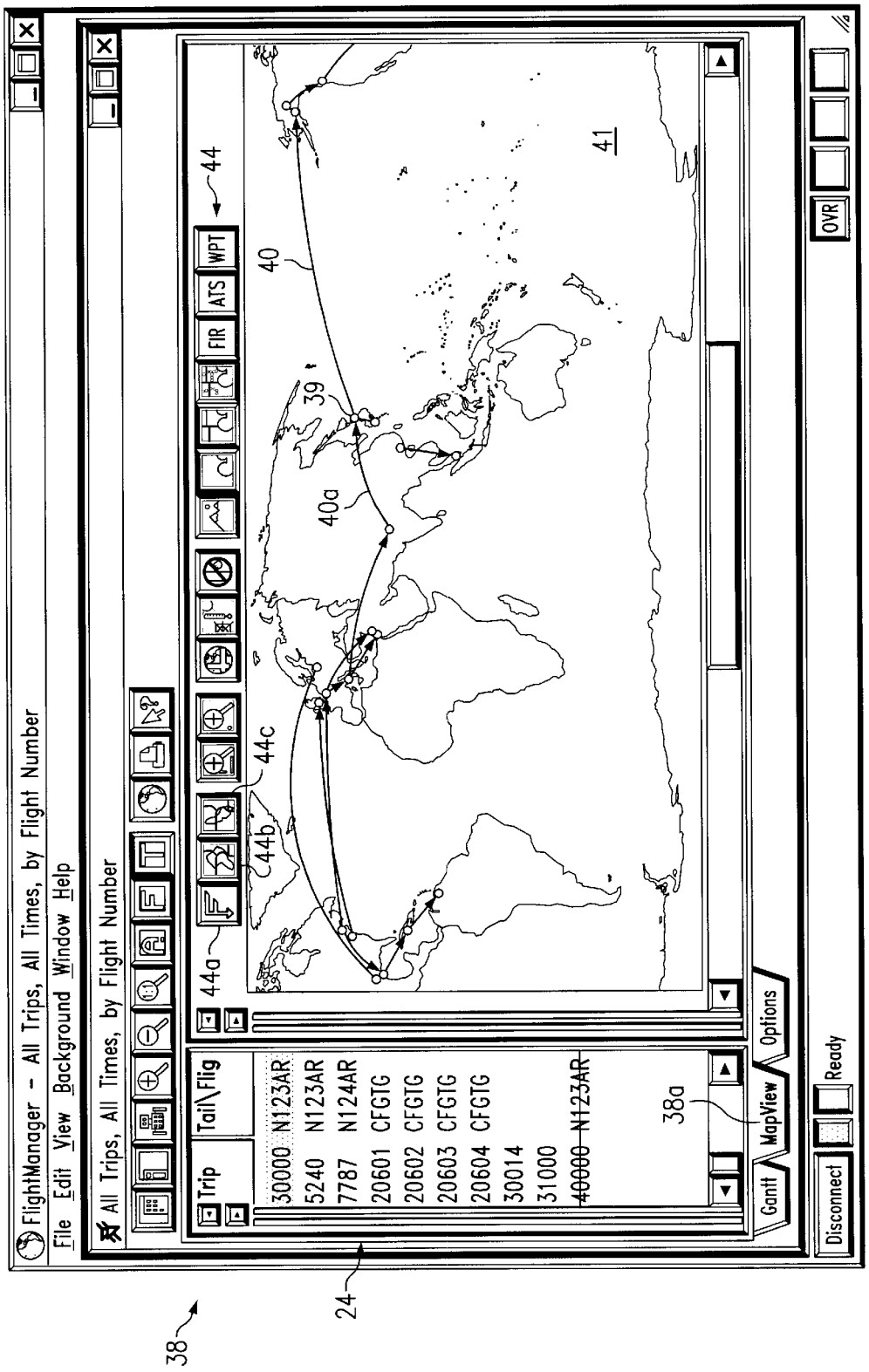
FIG. 3 shows a Map View screen of the FOS of FIG. 1 with a pop-up text box invoked.

FIG. 3 illustrates Map View screen 38 of the FOS 10, which provides graphically depicted trips scheduled through the OC. Images in this view category are generated by way of the Render Engine 16. The user selects this viewing category by way of Map View tab 38a. In the illustrated embodiment, airports are represented as colored dots 39, and trip paths are displayed as colored lines 40. The user can actually monitor the progress of trips planned through the OC in real-time. The Map View screen 38 includes Map Pane 41 in a region on the right side of the screen and, on the left side of the screen, the trip list or Left Gantt Pane 24. When a trip is highlighted on the trip list of the Left Gantt Pane 24, the path line 39 for the highlighted trip is automatically zoomed in the Map Pane 41. If a trip leg is further selected by a mouse click on a portion of the path line 39 representing that leg, pop-up text box is displayed (see FIG. 4E, discussed below), similar to the pop-up box 36 of FIG. 2C, which displays detailed information about the highlighted and selected leg.

A set of icons 44 is available in the Map View 38, which enable the user to view selections of trip identification information, task or services information and environmental factors potentially affecting a trip, such as weather. Selecting appropriate icons superimposes Winds, fully adjustable by height and time, Satellite, Radar, Temperature, ICAO Locations, Long Runways, Land Mass, and Political Boundaries on the world map along with the airport dots 39 and the trip path lines 40. Zoom in and zoom out views are available for any area of the world map. For example, when the Show Winds icon 44a is clicked, a view of the wind Speed, wind direction, and air temperatures are displayed over the map. The wind speed at various heights can also be shown by selecting a Wind Ht value.

The FOS 10 also provides views of forecast winds over various time periods. A Winds Valid dialog box on the screen (not shown) contains the list of available wind products, the date and time when the map was issued, and the date and time until when the map is valid.

If the user clicks on Satellite icon 44b, satellite images will be shown covering the world from 75° north to 75° south latitude. Similarly, Show Radar icon 44c invokes weather radar images. The images are updated at various times throughout the day by way of the Render Engine 16 of the FOS 10. The user can also obtain information about when the images were last downloaded.

Figure 4A:
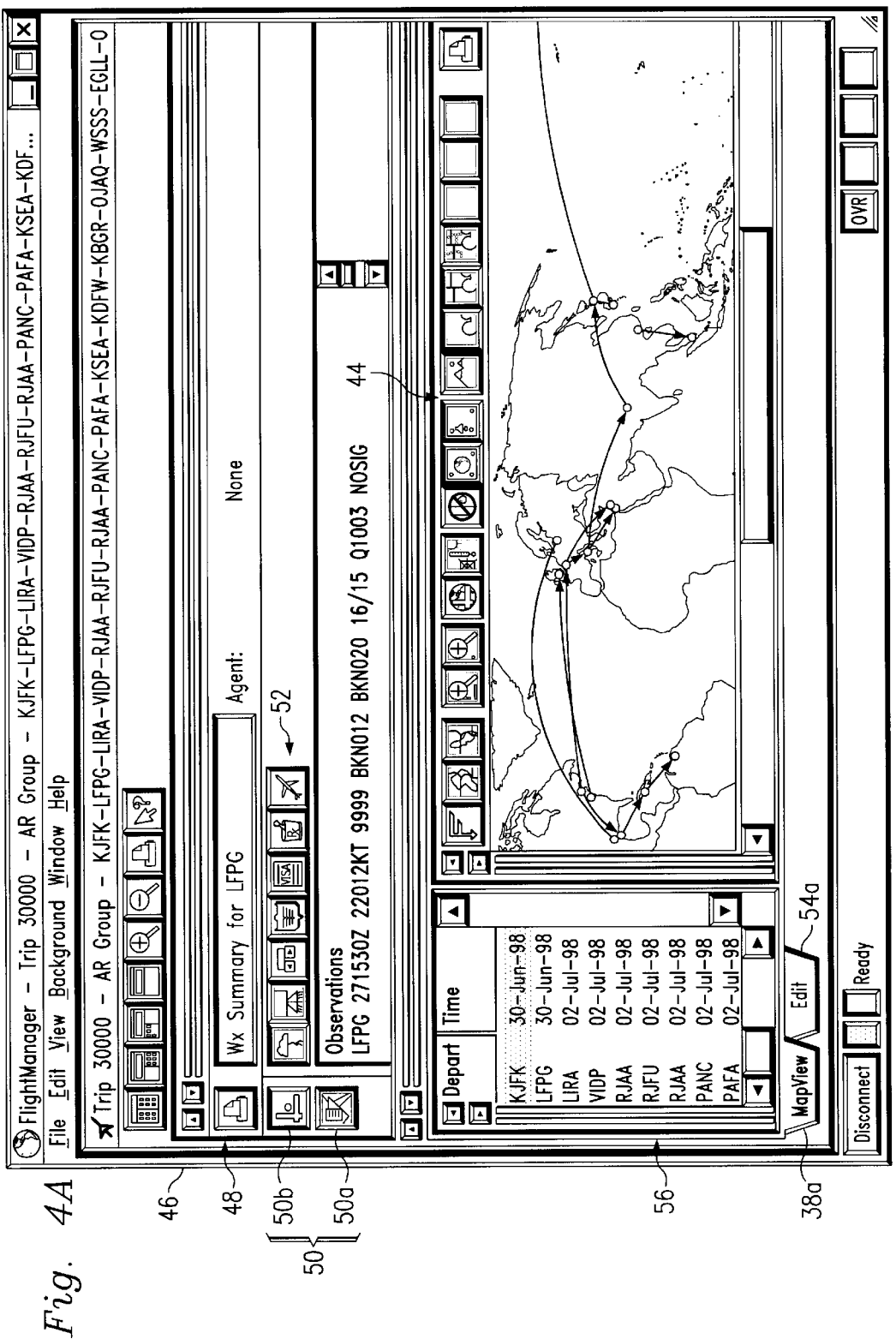
FIG. 4A shows a Trip View of the FOS of FIG. 1.
Figure 4B:
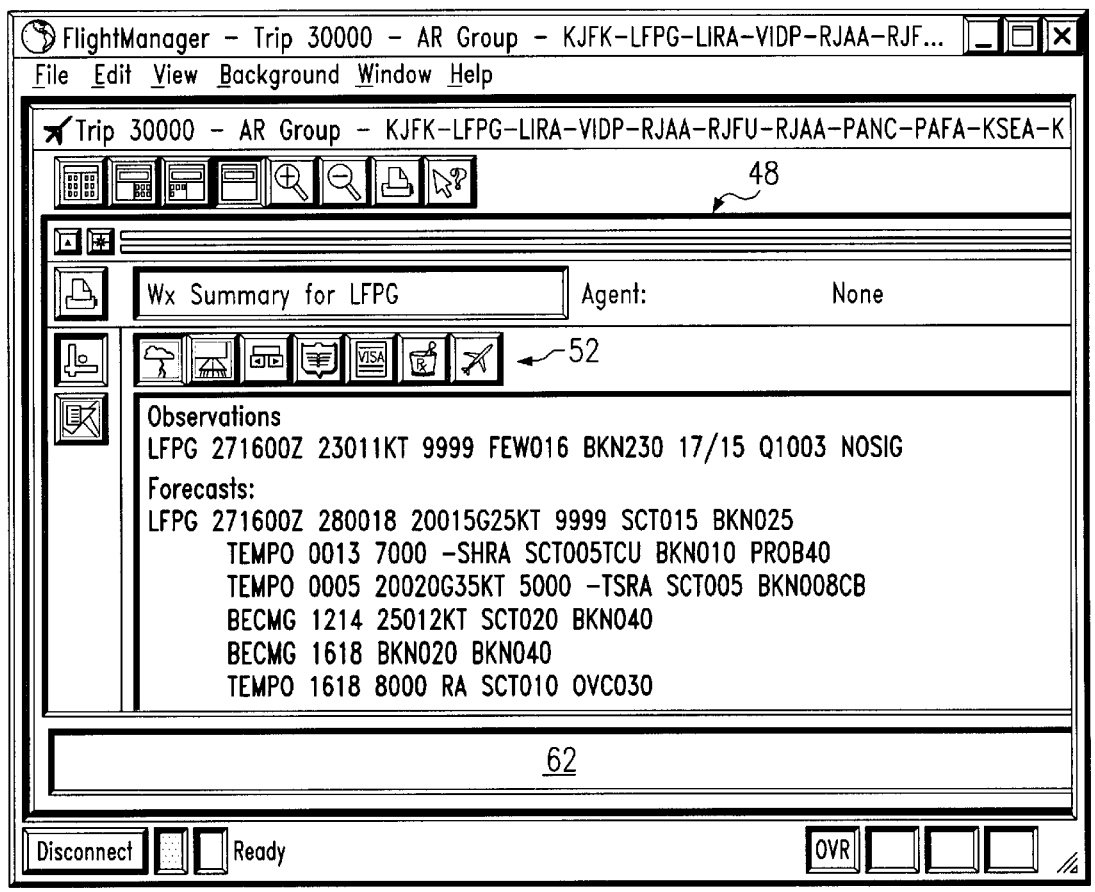
FIG. 4B shows a close view of the Context Pane of the Trip View of FIG. 4A.

A Trip View screen 46 is shown in FIG. 4A. The Trip View screen 46 provides the ability to display all information available from the UDC for a single trip, including all services for each leg of the trip. In particular, the top portion of the screen is a Context Pane 48, which is also shown in detail in FIG. 4B. The Context Pane 48 includes two key icons 50 on the left, arranged vertically on the screen. A set of icons 52 lining up horizontally along the top of the Context Pane 48 changes in response to the selection of a corresponding key icon 50 on the left. For example, clicking an Airport Information icon 50a on the left causes the display of a set of horizontal icons relating to airports, including icons for Wx Summary, Agent, Airport, Communications, Frequencies, Country, Security, Visa, Health and Aircraft. Further clicking on individual icons within the Airport Information icon set causes the display of detailed information about a particular leg selected in the Leg List Pane 56 (discussed below) in the lower left screen region of FIG. 4A.

Similarly, when Trip Info icon 50b on the left side of the Context Pane 48 is clicked, icons representing the various tasks or services and other pertinent trip information pertaining to each task that the OC is providing for each particular location in a trip are enabled.

Figure 4C:
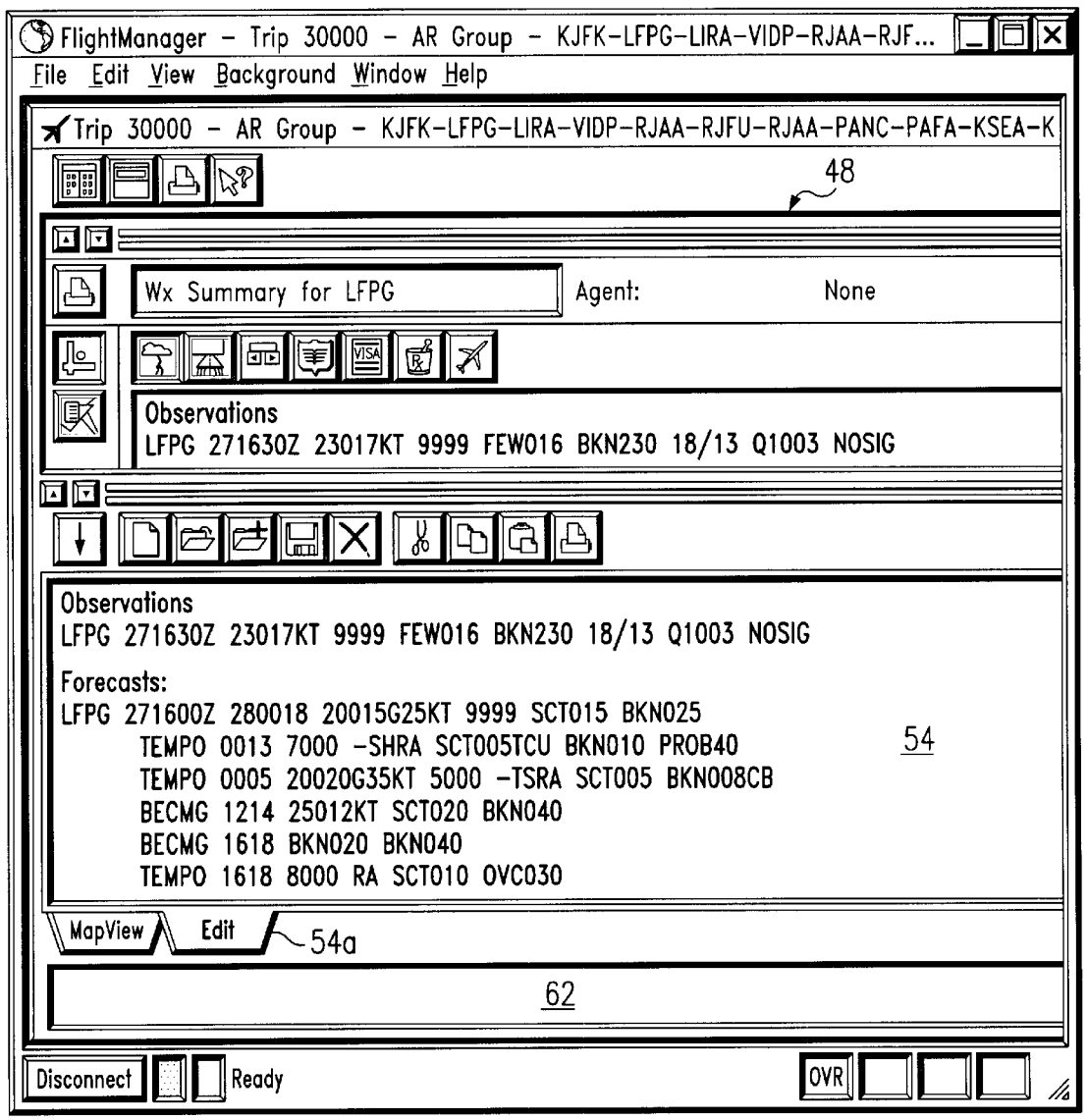
FIG. 4C illustrates a built-in Editor of the FOS of FIG. 1.

As best shown in FIG. 4C, a built in editor 54 for creating documents from user selected information in the Context Pane 48 can be invoked by selecting Edit tab 54a. The editor 54 is capable of converting the information displayed in the Context Pane 48 to text files that can be edited, saved, printed, and sent as email.

Figure 4D:
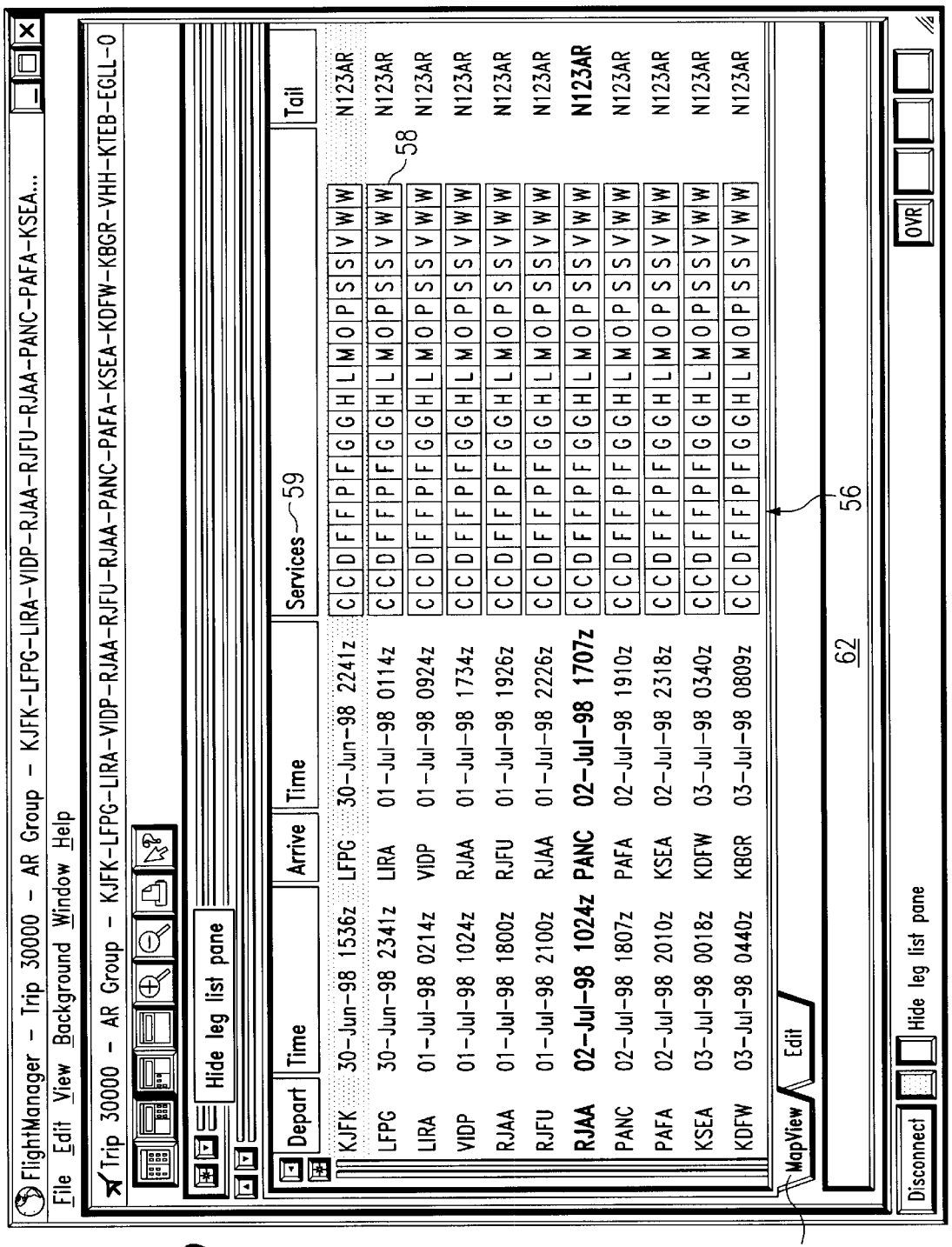
FIG. 4D shows a Leg List Pane of the Trip View of FIG. 4A.

As best shown in FIG. 4D, the lower left portion of the Trip View screen 46 (FIG. 4A), includes Leg List Pane 56 for displaying all the legs of a selected trip, along with information specific to each leg. The Leg List Pane 56 includes a services column 59 for displaying services for each leg, and their status, in colored boxes 58, following the same lettering and color scheme as the boxes 32 discussed above as displayed in the left Gantt Pane 24 of the Trip List Screen 22 (FIG. 2A). Legs that have been canceled appear with a strike-though line, and ICAO codes identify the departure and arrival locations for each leg, using the same display format as the Trip List or Left Gantt Pane 24 of FIG. 2A.

Figure 4E:
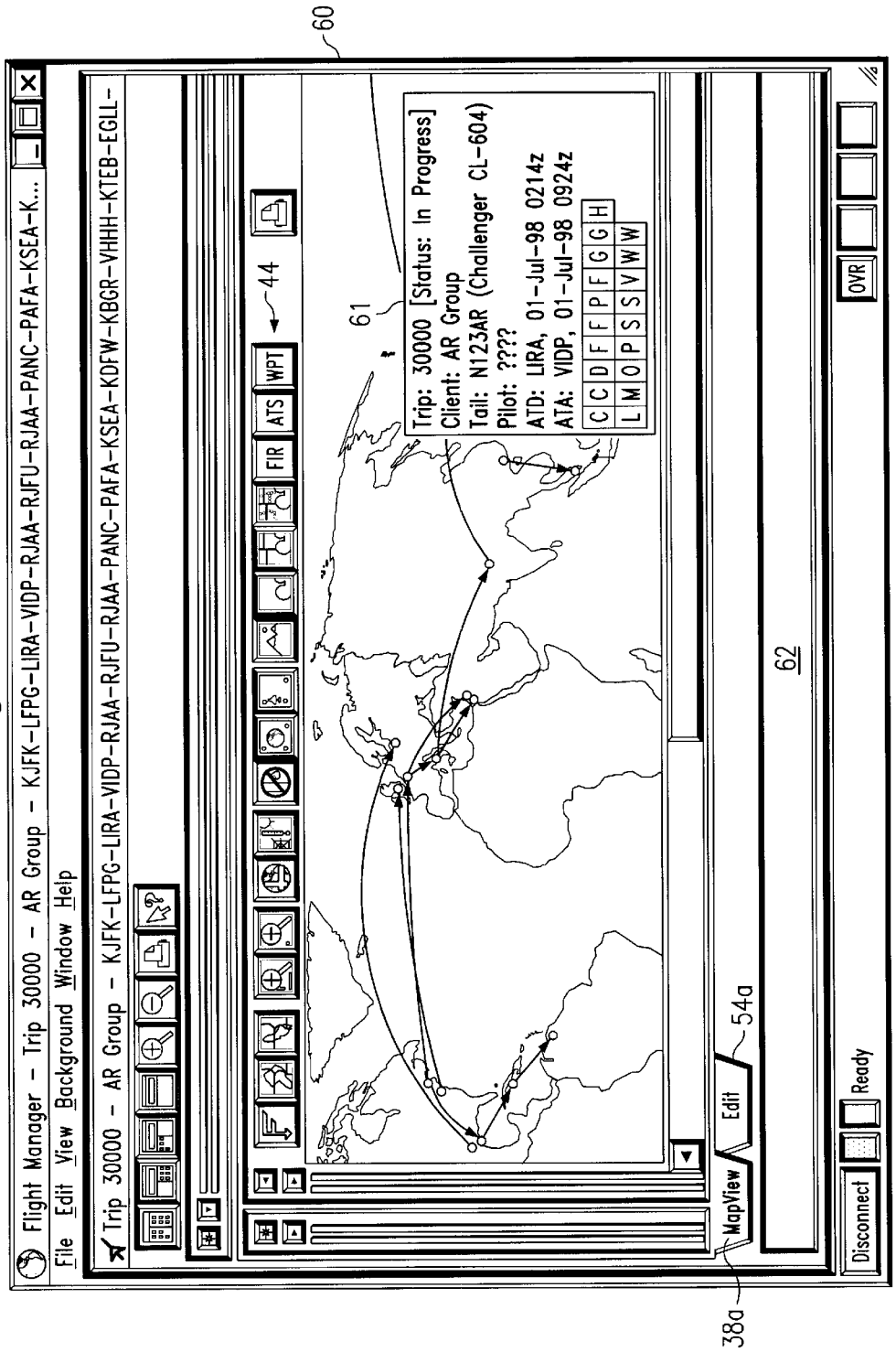
FIG. 4E shows a close view of the Map Pane of the Trip View screen of FIG. 4A.

The lower right portion of the Trip View screen 46 (FIG. 4A) contains trip paths as colored lines in its Map Pane 60, in the same way as the lower right portion of the Map View screen 38 of FIG. 3. However, when displayed by way of the Trip View Screen 46 (FIG. 4A) (as opposed to the Trip List Screen 22 of FIG. 2A), much more detailed information can be displayed in the geographical map format made by the Render Engine 16, as best shown in FIG. 4E, in which the two other panes are hidden. For example, weather information, including Winds, Radar, and Temperature, can be displayed along with ICAO locations, and Long Runways for each leg of the trip. Selecting a leg in the Leg List Pane 56 (FIG. 4A) zooms that particular leg in this Map Pane 60. Placing the mouse pointer on any of the legs in the Map Pane 60 will display a condensed form of leg details in a pop-up text box such as box 61 in FIG. 4E, including Trip Number, Client, Tail, Departure and Arrival Location, Date and Time, and Weather information.

By clicking any of the icons in the icon set 44 on respective icons above the map, various features are enabled such as Show Winds, Show Satellite, Show Radar, Zoom to Current Trip, Zoom to Current Leg, Show ICAO Locations, Show Temperature, Show Long Runways, Show Current Trip, Show Trip Positions, Show Surface Elevation, Show Political Boundaries, Show US County Boundaries, Fir Boundaries, ATS Routes and Waypoints.

The bottom portion of the Trip View screen 46, as shown in FIGS. 4B, 4C, 4D, and 4E, includes a text box 62 for typing in commands. Using the text box 62, preprogrammed commands can be keyed in to submit information queries to the software. For example, the user can ask for the distance between two airports, or can select a different trip to view, without having to go to the Trip List screen. The text box 62 is available from the Trip View screen 46 from either the Map View tab 38a or the Edit tab 54a.

Figure 5:
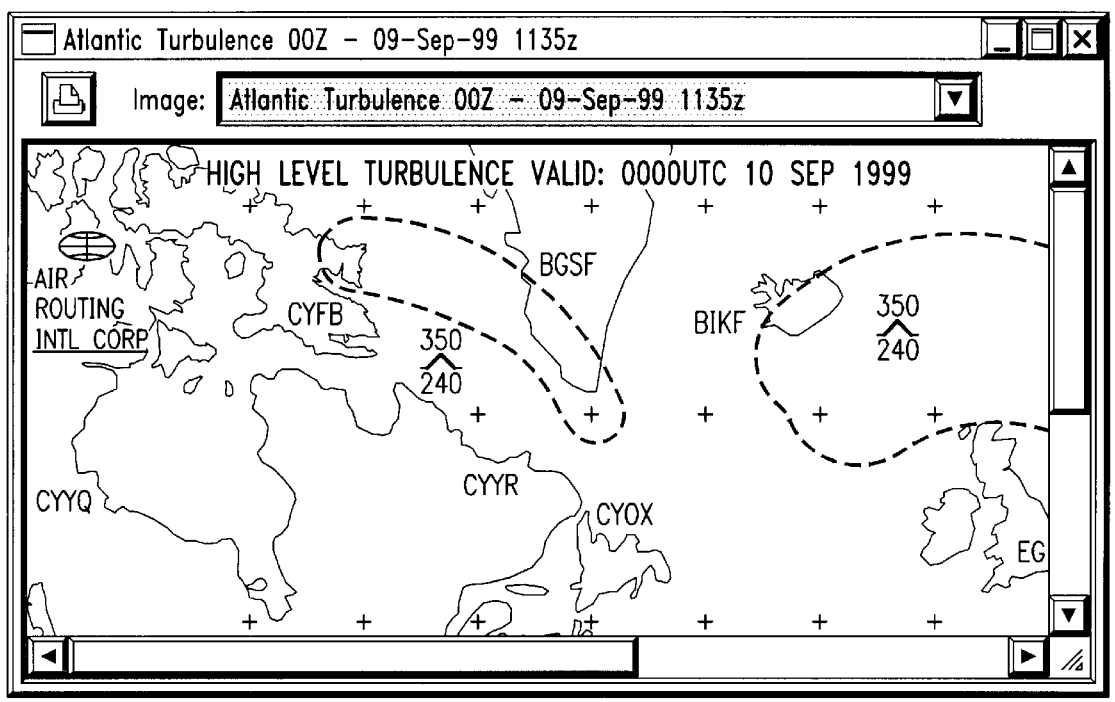
FIG. 5 is an Image View screen showing a weather map.
Figure 6:
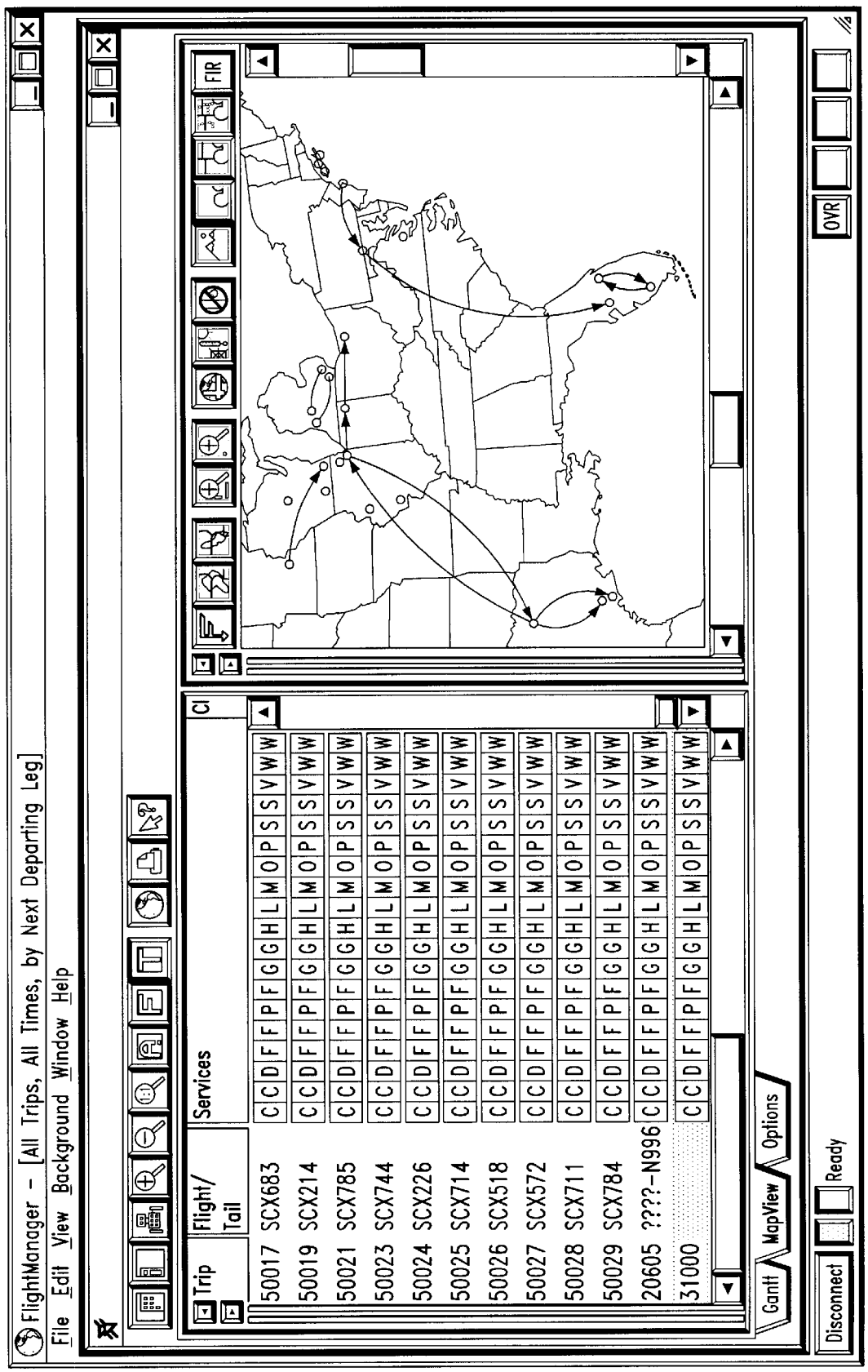
FIG. 6 shows airplanes flying on Map Pane 38.

An Image View 64 is also made available by the FOS for displaying up to the minute weather forecast information in map form, as illustrated in FIG. 5.

A remote user can access the information available from the OC using either an Internet or a direct dial-up connection to the UDC, using the Connect Configuration screen (not shown) of the UI 12. This screen gives the user various options related to his connection to the UDC. For example, a Primary Distribution Server slot (not shown) can be modified to select a particular server of the UDC. By clicking on an Edit Settings button, the user can customize the type of data to be "pushed" to his computer for the purpose of updating the screen.

One feature of the invention is the display of the position of an aircraft in flight on the Map View screen 38. The FOS 10 can determine the current position for the displayed aircraft in one of three ways. For trips that involve a departure or arrival location within the United States, Canada, or the United Kingdom, presently the FAA tracks aircraft and makes available aircraft positions in flight by way of an ASD data feed. This ASD data feed is collected by the FOS and "pushed" by way of the UDC 18 and its Packet Manager 17 to one of the User Interfaces 12, where the information is displayed by way of an airplane icon. A symbol on the airplane icon can conveniently be used to communicate to the user the basis for the position indicated by the airplane icon on the Map View screen. For example, because this is the most accurate and timely method for determining aircraft location, in an exemplary embodiment of the invention, a large X is used on the airplane icon to communicate to the user that the aircraft's position is as determined by this most accurate and current method.

For trips that do not involve those three countries for which the FAA currently tracks aircraft, but for which the plane is communicating its position to the ground through airline communication systems, that data stream information is collected by the FOS 10, and "pushed" to the User Interfaces 12 to display the current position of the aircraft on the Map View screen 38. A smaller size symbol can conveniently be used to communicate to the user that the represented aircraft location is as determined by this secondary method of determining aircraft location along its path. In the above described exemplary embodiment of the invention, a small "x" is used for the purpose of indicating to a user the underlying method by which the aircraft position was determined for the graphic representation of its current location on the Map View screen 38.

A third way that the OC uses to present to the user the current position of an aircraft along its trip path is by calculating the current position based on the flight plan as filed for that aircraft trip. When this third way of determining the location of the aircraft has been used by the OC to present aircraft location to the user, the exemplary embodiment uses the lack of any symbol on the airplane icon to indicate this tertiary method of determining the location of the aircraft at any point in time.

Additional information about the user interface 13 and its features is contained in the printed publication entitled "Air Routing Flight Manager™ Gateway to the World User Guide" available from the Assignee of the invention claimed herein, a copy of which publication accompanies this application as filed, the contents of which is hereby incorporated herein by reference.

Additional information about the invention as a whole, and its features, is contained in the CD ROM entitled "Air Routing Flight Manager™ Gateway to the World" and also labeled Air Routing Flight Manager v1.1, which accompanies this application, the contents of which is hereby incorporated herein by reference.

As can now be appreciated, the FOS 10 provides a flexible, user friendly environment for accessing complete and up to the minute flight identification information, flight services information and environmental factors information. The FOS 10 makes information available to multiple users in real time, which enables its users to respond in a timely fashion to unexpected changes throughout the trip.

The FOS 10 also allows a user to log on remotely from multiple locations as long as a network connection can be made. This feature enables user access to the information instantaneously, without being restricted to an operation center or a control room.

Up to the minute information is made possible by the FOS 10's use of push technology. The Packet Manager 17, by loading object-based modules to the memory space as soon as a connection is made to the UDC 18, pushes data and graphs automatically to any connected user, without requiring any additional action by the user. This makes possible a real time animation representation to the user.

The above detailed description is of a preferred embodiment of the invention, and is used to illustrate and make clear the various features of the invention with reference to particular screen displays, which are merely examples of displays, components and processes of the method, system and computer program of the present invention. While the invention has been particularly shown and described with reference to a preferred embodiment, it will be understood by those skilled in the art that various changes in form and detail may be made without departing from the spirit and scope of the invention, as set forth in the following claims.

What is claimed is:

1. A method for planning and tracking at least one air travel trip from an operational center and for providing access to multiple users to user selected information about the trip, wherein said trip includes at least one trip leg, said method comprising the steps of:

providing a first interactive pane on a terminal screen in text format for displaying data about the real time progress of the at least one trip as planned by the operational center;

providing a second interactive pane in text format for displaying the real time progress of the at least one trip leg against a date and time scale; and providing a third interactive pane in graphics format for displaying the real time progress of the at least one trip leg superimposed on a geographical map; and using push technology to enable the operational center to supply real time updates to the first, second and third interactive panes.

2. The method of claim 1 wherein the using step includes providing an upstream data distribution center with a data packet manager.

3. The method of claim 2 wherein the data packet manager uses object-relational mapping, object caching and proactive notification technology.

4. The method of claim 1 wherein the first and second interactive panes of the first and second providing steps include an array of color coded textual codes wherein the textual codes represent a corresponding array of plannable and trackable services and the color of the textual codes represents the current status of each of the services represented by each of the textual codes.

5. The method of claim 1 wherein the third interactive pane displays the at least one trip leg as a curve representing an actual flight path of an aircraft and further displays a symbol representing the location of the aircraft along the displayed flight path.

6. The method of claim 1 wherein the third interactive pane displays current environmental weather information pertaining to a trip leg.

7. The method of claim 6 wherein the third interactive pane includes user selectable sets of sources for the environmental weather information to display wherein said user selectable sets include satellite and radar images.

8. The method of claim 1 wherein user selection of a flight trip in the first interactive pane automatically selects corresponding trip legs in the second and third interactive panes to enable the user to access selected detail information pertaining to the user selected flight trip from either of the panes.

9. The method of claim 8 wherein the second and third interactive panes include user activatable pop-up text boxes for displaying detailed information about the selected trip.

10. The method of claim 1 further comprising the step of providing a text editor for convertinguser selected screen information into downloadable text.

11. The method of claim 1 further comprising the step of providing an interactive command line text box for directly requesting information available from any of the first, second and third interactive panes.

12. A system for managing at least one air flight trip from an operational center and at least one remote terminal not in the operational center, said air flight trip having at least one trip leg covering an air flight from a first airport to a second airport, said system comprising:

a flight operations system including a data engine, a render engine, and a first user interface;

a second user interface remotely operably connectable to the flight operations system; and a distribution center accessible by the first and second user interfaces wherein the distribution center includes a packet manager for distributing text data from the data engine and image data from the render engine to the first and second user interfaces.

13. The system of claim 12 wherein the packet manager provides information in text and image format to the first and second user interfaces using object-relational mapping, object caching and proactive notification technology.

14. A computer program for providing user access to real time information about at least one air flight trip by way of a user interface, wherein said air flight trip includes at least one trip leg covering an air flight from a first location to a second location, said program comprising:

a first interactive pane on a terminal screen in text format displaying data about the at least one air flight trip;

a second interactive pane in text format displaying the at least one trip leg against a date and time scale;

a context pane including airport information and trip services information text format;

a context pane text editor for converting user selected context pane information into downloadable text;

a third interactive pane in graphics format displaying the at least one trip leg superimposed on a geographical world map; and a command line pane for receiving commands;

wherein the program uses object-relational mapping, object caching and proactive notification technology to enable mutiple users to access the real time information by way of the first, second, and third interactive panes, the context pane, and the command line, through a computer network.

15. The program of claim 14 wherein the at least one air flight trip is selected by an end user of the program.

16. The program of claim 14 wherein the data about the at least one air flight trip includes a set of color coded service identifiers wherein the color of each service code represents the most critical current status of that service for any leg of the at least one flight trip.

17. The program of claim 14 wherein the at least one trip leg in the second interactive pane depicts the trip leg as a color bar wherein the bar color represents the current status of the most critical service for the at least one trip leg.

18. The program of claim 14 wherein the third interactive pane displays the at least one trip leg as a curve representing an actual flight path of an aircraft and further displays a symbol representing the location of the aircraft along the displayed flight path.

19. The program of claim 14 wherein the third interactive pane displays current environmental weather information pertaining to a trip leg.

20. The program of claim 19 wherein the third interactive pane includes user selectable sets of sources for the environmental weather information to display wherein said user selectable sets include satellite and radar images.

21. The program of claim 14 wherein user selection of a flight trip in the first interactive pane automatically selects corresponding trip legs in the second and third interactive panes to enable the user to access selected detail information pertaining to the user selected flight trip from either of the panes.

22. The program of claim 21 wherein the second and third interactive panes include user activatable pop-up text boxes for displaying detailed information about the selected trip.

23. The program of claim 14 further comprising a text editor for converting user selected screen information into downloadable text.

24. The program of claim 14 further comprising an interactive command line text box for directly requesting information available from any of the first, second and third interactive panes.

25. A method for integrating air travel and related information for planning and executing one or more trips involving at least one flight, said method comprising the steps of:
   collecting the air travel and related information;
   updating the air travel and related information by using push technology; and
   making available real time updates of air travel and related information through computer networks.

26. The method of claim 25 wherein the air travel and related information includes:
   trip identification information;
   tasks being performed during the trip; and
   environmental factors affecting the trip.

27. The method of claim 26 wherein the trip identification information includes:
   a predefined trip identifier;
   a predetermined aircraft identifier;
   a predetermined pilot identifier;
   a predetermined client identifier;
   a set of predetermined service identifiers; and
   beginning and ending location identifiers.

28. The method of claim 26 wherein the environmental factors include:
   weather information;
   satellite image of the earth; and
   radar shots of the earth.

29. The method of claim 26 wherein the environmental factors can be superimposed over a global geographical map.

30. The method of claim 26 wherein the tasks include:
   catering service;
   customs setup;
   flight plan;
   fuel service;
   ground services;
   landing permits;
   overflight permits;
   security guard service;
   landing slot reservation service;
   weather brief;
   visa information; and
   weather forecast information.

31. The method of claim 26 wherein the tasks are displayed as colored boxes, the colors indicating completion status of the tasks.

32. The method of claim 26 wherein the flight is represented by a colored bar, the color representing a status of at least one service related to the flight.

33. The method of claim 26 wherein the at least one flight is represented by a curve superimposed over a world map, the curve representing the actual travel path of the flight, wherein selection of the curve by a user interface tool invokes a text box displaying the air travel and related information.

* * * * *

UNITED STATES PATENT AND TRADEMARK OFFICE
CERTIFICATE OF CORRECTION

PATENT NO. : 6,353,794 B1
DATED : March 5, 2002
INVENTOR(S) : Barry Davis, Scott Blachowicz, Larry Brasheld, Dennis Howard, David Helms, Craig Paynter, Randy Robertson and James Rouse It is certified that error appears in the above-identified patent and that said Letters Patent is hereby corrected as shown below:

Column 6,
Lines 33-34, the return should be deleted and the paragraphs combined.

Column 8,
Line 11, "by the FOS and "pushed" by way of the UDC 18 and its"
should be -- by the FOS 10 and "pushed" by way of the UDC 18 and its" --.

Column 10,
Line 9, "providing a text editor for convertinguser selected screen" should read
-- providing a text editor for converting user selected screen --.

Signed and Sealed this

Eighteenth Day of June, 2002

Attest:

Attesting Officer

JAMES E. ROGAN
Director of the United States Patent and Trademark Office